(12) United States Patent  (10) Patent No.: US 7,406,575 B2
Lam et al.  (45) Date of Patent: *Jul. 29, 2008

(54) METHOD AND SYSTEM FOR STORING DATA

(75) Inventors: Wai T. Lam, Jericho, NY (US); Xiaowei Li, Hauppauge, NY (US)

(73) Assignee: FalconStor, Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/811,481

(22) Filed: Jun. 11, 2007

(65) Prior Publication Data

US 2007/0245103 A1  Oct. 18, 2007

Related U.S. Application Data

(63) Continuation of application No. 10/771,854, filed on Feb. 4, 2004, now Pat. No. 7,231,502.

(51) Int. Cl.
*G06F 12/00* (2006.01)

(52) U.S. Cl. .................. 711/161; 711/162; 711/206; 711/208; 711/211; 707/204; 709/224; 714/15

(58) Field of Classification Search ................ 711/161, 711/162, 206, 208, 211; 707/204; 709/224; 714/15

See application file for complete search history.

(56) References Cited

U.S. PATENT DOCUMENTS

| 5,812,773 | A | 9/1998 | Norin |
|---|---|---|---|
| 6,023,710 | A | 2/2000 | Steiner et al. |
| 6,157,991 | A | 12/2000 | Arnon |
| 6,298,386 | B1 * | 10/2001 | Vahalia et al. ............... 709/234 |
| 6,662,282 | B2 | 12/2003 | Cochran |
| 6,691,139 | B2 | 2/2004 | Ganesh et al. |
| 6,735,637 | B2 | 5/2004 | Cochran |
| 6,934,723 | B2 | 8/2005 | Breiter et al. |
| 6,986,015 | B2 | 1/2006 | Testardi |
| 7,231,502 | B2 | 6/2007 | Lam et al. |
| 2001/0007103 | A1 | 7/2001 | Breiter et al. |
| 2003/0220944 | A1 | 11/2003 | Lyman Schottland |
| 2005/0044197 | A1 | 2/2005 | Lai |

FOREIGN PATENT DOCUMENTS

| WO | WO 02/25443 A1 | 2/2002 |
|---|---|---|
| WO | WO 03/017022 A3 | 2/2003 |

* cited by examiner

*Primary Examiner*—Stephen C Elmore
(74) *Attorney, Agent, or Firm*—Brandon N. Sklar; Jonathan Tyler; Kaye Scholer LLP

(57) ABSTRACT

In one example, an apparatus is provided to store data in one or more data storage systems by selecting from among at least a first operating mode and a delta replication operating mode. The apparatus comprises a means for storing data pursuant to the first operating mode and a means for ascertaining a first status of a criterion pertaining to an activity performed by the one or more data storage systems while operating in the first operating mode. The apparatus further comprises a means for detecting a change in the criterion to a second status, and a means for storing data pursuant to the delta replication operating mode in response to the change.

52 Claims, 11 Drawing Sheets

| DATA BLOCK I.D. | OVERWRITE FLAG |
|---|---|
| DATA BLOCK 1 | 0 |
| DATA BLOCK 2 | 1 |
| DATA BLOCK 3 | 1 |
| DATA BLOCK 4 | 0 |

525

| DATA BLOCK IDENTIFIER | DATA ITEM COUNT | AGGREGATE QUANTITY OF DATA TO BE WRITTEN (BYTES) |
|---|---|---|
| DATA BLOCK 2 | 3 | 3000 |
| DATA BLOCK 3 | 1 | 1000 |
| DATA BLOCK 8 | 5 | 5000 |
| TOTAL NUMBER OF DATA BLOCKS = 3 | | TOTAL = 9000 BYTES |

Fig. 9

METHOD AND SYSTEM FOR STORING DATA

The present application is a continuation of U.S. patent application No. 10/771,854, which was filed on Feb. 4, 2004 U.S. Pat. No. 7,231,502, which issued on Jun. 12, 2007, is assigned to the assignee of the present application, and is incorporated by reference herein in its entirety.

BACKGROUND OF THE INVENTION

1. Field of the Invention

The invention relates generally to a system and method for storing data, and more particularly, to a method and system for backing up data stored on a primary storage system.

2. Description of the Related Art

In many computing environments, large amounts of data are written to and retrieved from storage devices connected to one or more computers. As more data is stored on and accessed from storage devices, it becomes increasingly difficult to reproduce data if the storage devices fail. One way of protecting data is by backing up the data on backup media (e.g., tapes or disks).

One well-known approach to backing up data is to produce the backup copy at or near the site of the primary storage device, and then move the backup media to a safe location, where they are stored. For example, a technique known as mirroring can use this arrangement to generate a backup version of data. Specifically, in accordance with one form of mirroring, referred to as "synchronous mirroring," a first copy of data received from a client is written directly to an assigned location on the primary system, and a second copy of the data is written directly on the backup system. Typically, in a synchronous mirroring arrangement, additional data processing requests received from the client are not processed until the data is successfully stored on both systems.

Where the primary system and backup system are located at the same site, or are linked by a high-speed communication link, synchronous mirroring techniques can offer near instantaneous, up-to-date backup service. However, because transmissions from the client cannot be processed while data is being stored on the primary system and on the backup system, under some conditions, a synchronous mirroring arrangement can create significant delays for the client. If, for example, the backup system is located at a remote site, and/or the communication link from the primary system to the backup system is slow or susceptible to interruptions in service, the resultant delay may be unacceptable.

More recently, with the increasing availability of high-speed communication links, and of networking technology, it has become more common to locate a backup storage system at a site that is remote from the primary storage system. Since the advent of such remote storage systems, alternative approaches to mirroring have been developed.

One such method is known as "asynchronous mirroring." According to this method, data received from a client is inserted into a cache memory, which stores the data temporarily. After the data is inserted into the cache, additional data processing requests received from the client are processed. The data is flushed from the cache and stored on the primary system. Subsequently, when system resources allow, the data is flushed to the backup system and stored.

Because data processing requests, including data write commands, received from the client can be processed before the data is written to both the primary and backup systems, asynchronous mirroring offers more convenience to the client. However, the remote location of the backup system carries with it unique risks. For example, if a problem occurs in the communication link between the primary and backup systems and prevents data from being transmitted from the cache memory to the backup system, the data stored on the backup system may soon become out-of-sync with the data stored on the primary system.

A third method for backing up data is known as the delta replication method. Delta replication is not a form of mirroring. Using this approach, when data is received from a client, it is written to its assigned location on the primary system, but is not sent to the backup system. Instead, a record is kept of the data blocks in the primary system that are overwritten. From time to time a "delta replication" is performed, which includes copying to the backup system only those data blocks that have been overwritten.

Several disadvantages are associated with the delta replication method. If a problem occurs in the communication link between the primary system and the backup system during a delta replication, the backup copy stored on the backup system may become corrupted. To mitigate this risk, a snapshot of the backup disk is often generated immediately prior to performing each delta replication. Similarly, if the data stored on the primary system becomes corrupted during a delta replication (e.g., due to a hardware failure), then the only up-to-date version of the data would be lost. For this reason, a snapshot of the data stored on the primary system is often performed immediately prior to each delta replication.

SUMMARY OF THE INVENTION

To overcome the disadvantages of the above-described data back-up systems and methods, a system and method are provided for utilizing a first operating mode and a second operating mode to store data. In one example, an apparatus is provided to store data in one or more data storage systems by selecting from among at least a first operating mode and a delta replication operating mode. The apparatus comprises a means for storing data pursuant to the first operating mode and a means for ascertaining a first status of a criterion pertaining to an activity performed by the one or more data storage systems while operating in the first operating mode. The apparatus further comprises a means for detecting a change in the criterion to a second status, and a means for storing data pursuant to the delta replication operating mode in response to the change.

The first operating mode may include continuous replication, which may be performed synchronously or asynchronously, for example. The one or more data storage systems may include a primary storage system and a backup storage system. The criterion may include an indicator of a performance of a communication link between a primary storage system and a backup storage system, and the second status may include an indication of an interruption in a transmission of data via the communication link. The criterion may include a comparison of a first rate of data flowing into a memory in a data storage system, and a second rate of data flowing from the memory, and the second status includes an indication that the second rate exceeds the first rate. The criterion may include a measure of a quantity of data stored in a memory in the data storage system. The criterion may include a measure of a redundancy within a memory in the data storage system.

The apparatus may additionally comprise a means for identifying a first quantity of data required to be transmitted from the data storage system to a backup storage system in order to store a specified set of data items by the first operating mode, and a means for identifying a second quantity of data required to be transmitted from the data storage system to the backup storage system in order to store the set of data items by the delta replication operating mode, wherein the measure is a comparison of the first quantity and the second quantity.

In another example, an apparatus is provided to store data in one or more data storage systems by selecting from among at least a delta replication operating mode and an alternative operating mode. The apparatus comprises a means for storing data pursuant to the delta replication operating mode and a means for ascertaining a first status of a criterion pertaining to an activity performed by the one or more data storage systems while operating in the delta replication operating mode. The apparatus also comprises a means for detecting a change in the criterion to a second status and a means for storing data pursuant to the alternative operating mode, in response to the change.

In another example, an apparatus is provided to store data in a storage system comprising at least one first storage device and at least one second storage device. The apparatus comprises a means for storing first data in at least one first storage device, a means for storing the first data stored in the at least one first storage device in at least one second storage device, and a means for determining a condition. The apparatus further comprises a means for storing second data in the at least one first storage device, in response to the condition and a means for recording one or more memory locations associated with the storing of the second data in the at least one first storage device. The apparatus may further comprise a means for determining a second condition and a a means for copying the second data from the at least one first storage device to the at least one second storage device, based at least in part on the one or more recorded memory locations, in response to the second condition. The apparatus may additionally comprise a means for detecting a change of the condition to the second condition.

The apparatus may comprise a means for storing the first data in the at least one first storage device and in the at least one second storage device by continuous replication. The apparatus may further comprise a means for receiving a request to store specified data from a computer, a means for inserting the specified data in a memory, a means for transmitting an acknowledgment message to the computer, a means for transmitting the specified data to the at least one first storage device and to the at least one second storage device, and a means for removing the data item from the memory.

The apparatus may additionally comprise a means for determining the level of redundancy within data currently stored in the selected storage device is determined by computing a ratio of (1) a first quantity of data that must be transferred from the at least one first storage device to the at least one second storage device if a first method is used to back up data currently stored in the at least one first storage device, to (2) a second quantity of data that must be transferred from the at least one first storage device to the at least one second storage device if a second method is used to back up data currently stored in the at least one first storage device.

In another example, an apparatus is provided for storing data in one or more data storage systems. The apparatus comprises a means for storing data pursuant to a selected storage mode comprising storing the data in at least one first storage device and in at least one second storage device, a means for detecting a first condition pertaining to an activity associated with the storing of the data, and a means for storing data in the at least one first storage device, in response to the detected first condition. The apparatus also comprises a means for recording in a database information identifying one or more data blocks in the at least one first storage device that are changed, and a means for detecting a second condition pertaining to the activity. The apparatus further comprises a means for copying the one or more data blocks from the at least one first storage device to the at least one second storage device, based on the information, in response to the detected second condition. The apparatus further comprises a means for detecting a change of the first condition to the second condition.

In another example, an apparatus is provided for storing data in a storage system comprising at least one first storage device and at least one second storage device and being capable of having at least a first status of a condition and a second status of the condition. The apparatus comprises a means for receiving a request to store data, a means for checking a status of a condition of the storage system, and a means for causing the data to be stored in the at least one first storage device and in the at least one second storage device, if the first status is detected. The apparatus also comprises a means for storing the data in the at least one first storage device, if the second status is detected and a means for recording one or more storage locations of the stored data in the at least one first storage device.

The apparatus may also comprise a means for checking the status of the condition, and a means for copying data from the at least one first storage device to the at least one second storage device, based at least in part on the one or more recorded storage locations, if it is determined that the second status has changed to a third status.

In another example, a method to store data is provided. The method comprises receiving at least one first write command comprising first data, storing the first data in a first storage device, copying the first data from the first storage device to a second storage device and to a third storage device, and removing the first data from the first storage device. The method further comprises detecting a first condition, receiving at least one second write command comprising second data, after detection of the first condition, storing the second data in the first storage device, and copying the second data from the first storage device to one or more locations in the second storage device. The method also comprises generating a record of the one or more locations, removing the second data from the first storage device, detecting a second condition, and copying the second data from the second storage device to the third storage device based at least in part on the record, after detection of the second condition. The first storage device may comprise a staging storage device.

BRIEF DESCRIPTION OF THE DRAWINGS

These and other features and advantages of the invention will be apparent to those skilled in the art from the following detailed description of preferred embodiments, taken together with the accompanying drawings, in which:

FIG. 5 illustrates schematically a delta table that may be maintained by a storage manager, in accordance with an embodiment of the invention;

FIG. 9 illustrates schematically a data table that may be maintained by a storage manager, in accordance with an embodiment of the invention;

DETAILED DESCRIPTION OF THE PREFERRED EMBODIMENTS

In accordance with various aspects of the invention, a method and system are provided for storing data in one or more data storage systems by selecting from among a first operating mode and a delta replication operating mode. Accordingly, data is stored pursuant to the first operating mode, and a first status of a criterion pertaining to an activity performed by the one or more data storage systems is ascertained. The criterion is monitored, and if a change in the criterion to a second status is detected, data is stored pursuant to the delta replication mode. In one embodiment, the first operating mode may include, for example, continuous replication.

In one embodiment, the criterion may include, e.g., an indicator relating to the performance of a communication link between a primary storage system and a backup system. In such case, the first status may include an indication that data is being transferred successfully over the link, and the second status may include an indication of an interruption in the transmission of data over the link. Alternatively, the criterion may include, for example, a comparison of a first rate of data flowing into a memory, e.g., a staging storage device, within a data storage system, and a second rate of data flowing from the memory. In yet another embodiment, the criterion may include a measure of redundancy within a memory, e.g., a staging storage device, within a data storage system. In other embodiments, multiple criteria may be monitored.

Figure 1:
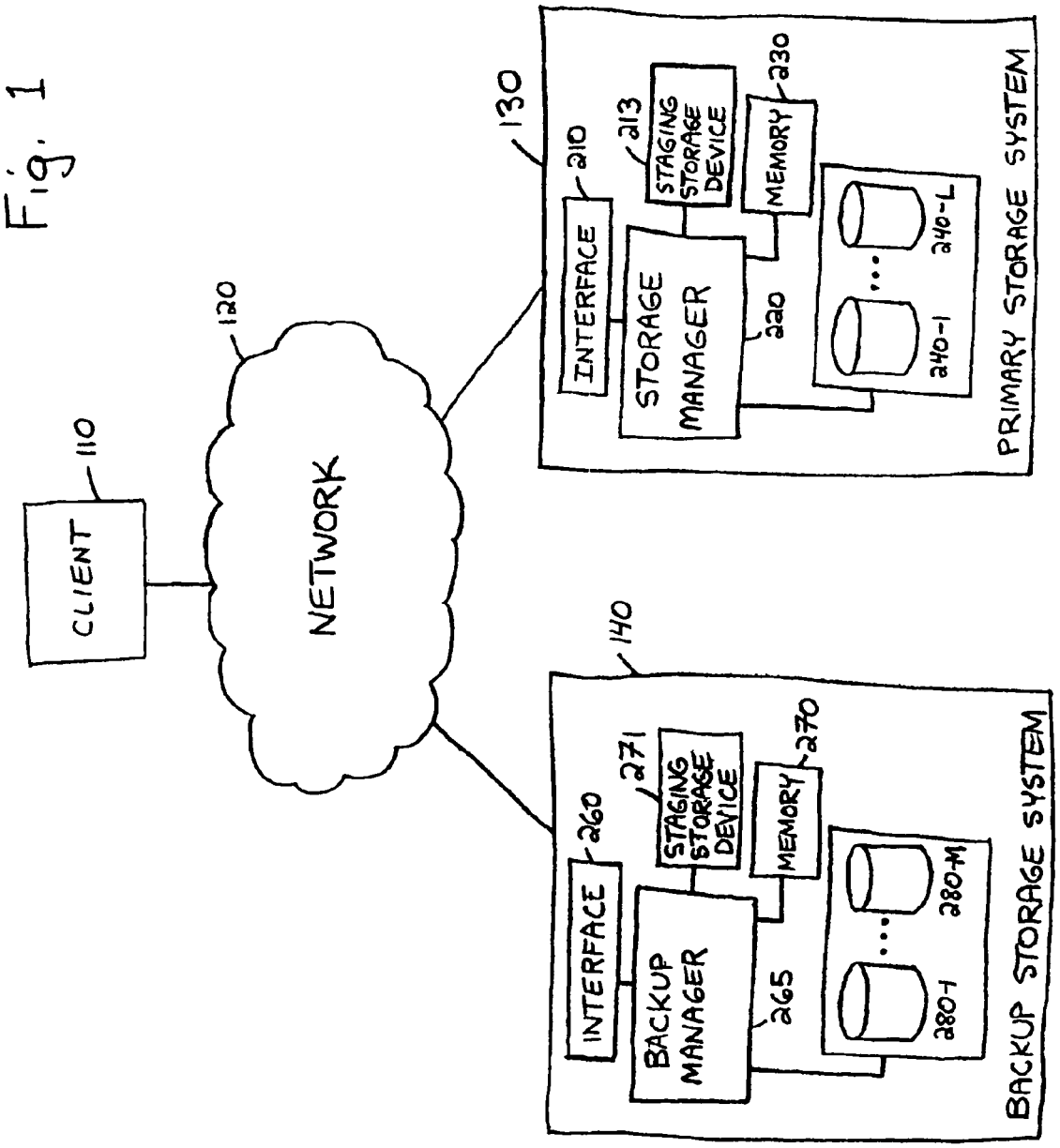
FIG. 1 illustrates a system that may be used to store data, in accordance with an embodiment of the invention.

FIG. 1 illustrates a system that may be used to store data, in accordance with an embodiment of the invention. Primary storage system 130 and backup storage system 140 are connected to network 120. Network 120 may be implemented as one or more of a number of different types of networks, such as, for example, an intranet, a local area network (LAN), a wide area network (WAN), an internet, Fibre Channel-based storage area network (SAN) or Ethernet. Alternatively, network 120 may be implemented as a combination of different types of networks.

Any number of clients (one of which, client 110, is shown in FIG. 1) may be connected to primary system 130 and backup system 140 over network 120. In one embodiment, client 110 may transmit to primary storage system 130 one or more data write commands each containing a data item intended for storage. In this embodiment, the term "data item" refers to a quantity of data contained in a data write command. In this embodiment, a data write command may also contain metadata pertaining to the data item. Metadata may include, e.g., data identifying an assigned data block in which the data item is to be stored in primary system 130. In one embodiment, client 110 may be, e.g., a computer.

Primary storage system 130 may be implemented by any storage mechanism that stores data and is capable of being backed up in accordance with the present invention. In the illustrative embodiment shown in FIG. 1, primary storage system 130 comprises storage manager 220, memory 230, interface 210, staging storage device 213 and storage devices 240-1 through 240-L, where L is an integer. Storage manager 220 orchestrates the operations of primary storage system 130, and manages the storage of data on storage devices 240. In one embodiment, storage manager 220 may receive data processing requests, including data write commands, from network 120, and send I/O commands to storage devices 240. For example, storage manager 220 may receive a data write command containing a data item, and cause the data item to be stored at an assigned location (e.g., an assigned data block) on storage devices 240. In one embodiment, storage manager 220 may be a software application. In an alternative embodiment, storage manager 220 may be a combination of software and digital or analog circuitry.

In one embodiment, communications between storage manager 220 and network 120 are conducted in accordance with IP or Fibre Channel protocols. Accordingly, in this embodiment, storage manager 220 receives from network 120 data processing requests formatted according to IP or Fibre Channel protocols.

Memory 230 is accessed by storage manager 220 to manage the flow of data to and from, and the location of data on, storage devices 240. For example, in one embodiment, storage manager 220 may store various tables indicating the locations and types of various data items stored in storage devices 240.

In one embodiment, staging storage device 213 functions as a temporary storage location for selected data items. In this embodiment, a data item written to, or inserted into, staging storage device 213 may be inserted into a queue, and temporarily remain in the queue within staging storage device 213. Storage manager 220 reads the data item and causes the data item to be stored on, say, backup storage system 140. In this embodiment, storage manager 220 may subsequently remove the data item from staging storage device 213. In one embodiment, staging storage device may be, e.g., non-volatile memory.

In this embodiment, storage manager 220 controls the insertion of data items into staging storage device 213, and the transmission of data items from staging storage device 213 to backup system 140, as appropriate. The flow of data items to and from staging storage device 213 is regulated by storage manager 220 in accordance with priorities established by the system operator. For example, in one embodiment, storage manager 220 may cause data items to be read from staging storage device 213 and transmitted to backup system 140 periodically and automatically, e.g., one data item every T seconds, where T is a predetermined number.

In one embodiment, data items inserted into staging storage device 213 may be managed on a first-in-first-out basis, to ensure that changes made to a given data file are recorded in the correct order. Accordingly, in this embodiment, data items are inserted sequentially into staging storage device 213 and, similarly, data items are read from staging storage device 213 and sent to backup storage system 140 in sequential order. In alternative embodiments, staging storage device 213 may not maintain a strict first-in-first-out mode of operation, but instead may process data items according to priorities established by storage manager 220. For example, in one such embodiment, storage manager 220 may receive and insert into staging storage device 213 data items from more than one client, but assign a higher priority to data items received from a selected client than to data items received from other clients. In this embodiment, storage manager 220 may, for example, cause data items from the selected client to be immediately read from staging storage device 213 and transmitted to backup system 140, while data items from other clients are transmitted only periodically. Nevertheless, in this embodiment, staging storage device 213 maintains a first-in-first out mode of operation with respect to data items received from any given client. In alternative embodiments, storage manager 220 may read a data item from staging storage device 213 and cause it to be stored on storage devices 240 of primary system 130.

Interface 210 provides a communication gateway through which data may be transmitted between primary storage system 130 and network 120. In various embodiments, interface 210 may be implemented using a number of different mechanisms, such as one or more SCSI cards, enterprise systems connection cards, fiber channel interfaces, modems, or network interfaces.

Each of storage devices 240-1 through 240-L may be implemented by any type of storage device that allows block-level storage access. In one embodiment, for example, storage devices 240 may be, e.g., disk drives. A disk drive typically includes one or more disks having a medium upon which information may be written. Each disk includes a number of physical tracks, each of which, in turn, is divided into one or more physical blocks. Accordingly, in this embodiment, an address identifying the location of a data block on a disk drive may specify a disk, a physical track and a physical block. Storage devices 240 are connected to storage manager 220, in accordance with one embodiment, by Fibre Channel interfaces, SCSI connections, or a combination thereof.

In one embodiment, communications between storage manager 220 and storage devices 240 are conducted in accordance with SCSI protocols. Accordingly, in this embodiment, storage manager 220 transmits data processing commands to, and receives data from, storage devices 240, in accordance with SCSI protocols.

One embodiment in which storage manager 220 dynamically allocates disk space for storing data is described below as an example. It should be noted, however, that this embodiment is for illustrative purposes and that other techniques for allocating disk space may be used.

Storage manager 220 may dynamically allocate disk space according to a technique that assigns disk space to a virtual disk drive as needed. The dynamic allocation technique functions on a drive level. In such instances, disk drives that are managed by storage manager 220 are defined as virtual drives. The virtual drive system allows an algorithm to manage a "virtual" disk drive having assigned to it an amount of virtual storage that is larger than the amount of physical storage actually available on a single disk drive. Accordingly, large disk drives can virtually exist on a system without requiring an initial investment of an entire storage subsystem. Additional storage may then be added as it is required without committing these resources prematurely. Alternatively, a virtual disk drive may have assigned to it an amount of virtual storage that is smaller than the amount of available physical storage.

Figure 2A:
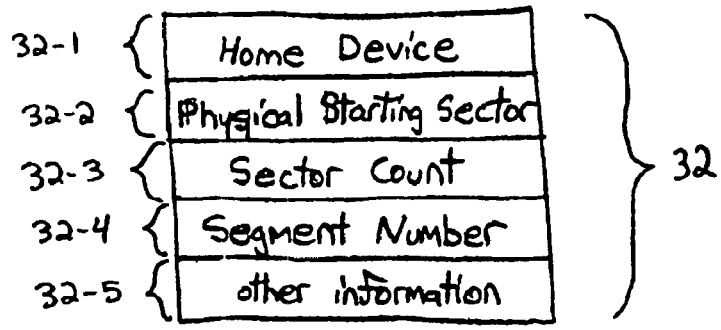
FIG. 2A illustrates schematically the contents of a segment descriptor, in accordance with an embodiment of the invention.

According to this embodiment, when storage manager 220 initially defines a virtual storage device, or when additional storage is assigned to the virtual storage device, the disk space on the storage devices is divided into segments. Each segment has associated with it segment descriptors, which are stored in a free list table in memory. Generally, a segment descriptor contains information defining the segment it represents; for example, the segment descriptor may define a home storage device location, physical starting sector of the segment, sector count within the segment, and segment number. FIG. 2A illustrates schematically the contents of a segment descriptor 32. Fields 32-1 through 32-5 contain data indicating, respectively, on which storage device the segment is located, the segment's starting physical address, the segment's size, a segment identifier, and other information which may be useful for identifying and processing the segment.

Figure 2B:
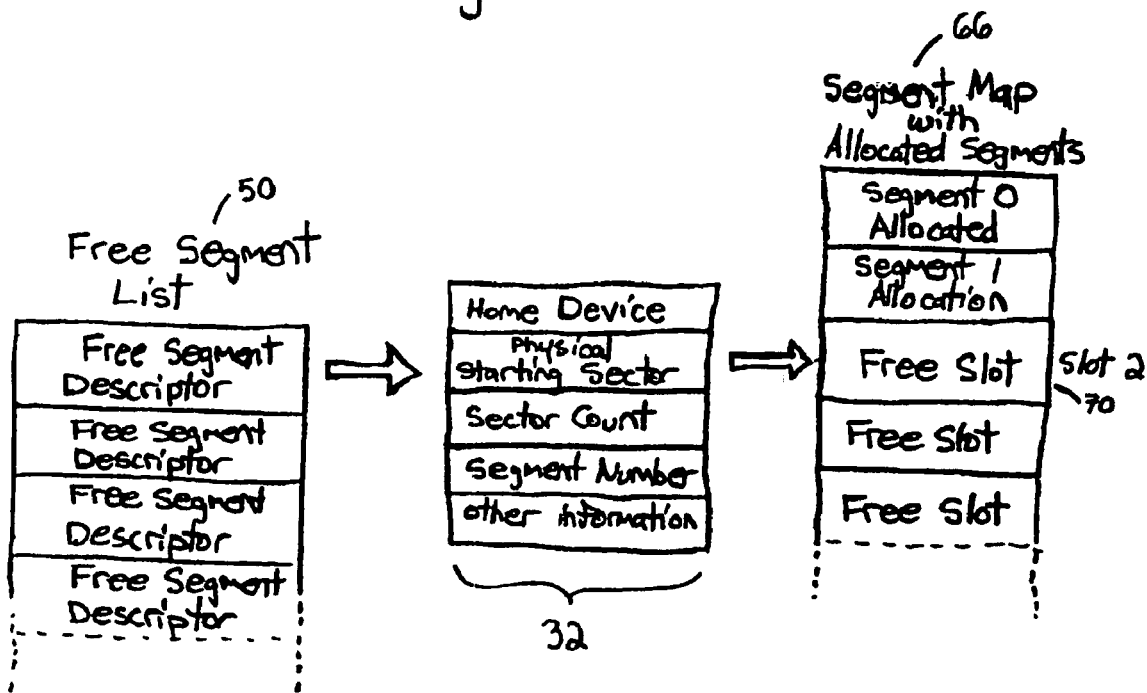
FIG. 2B illustrates a free segment list, a segment descriptor, and a segment map used to manage data in accordance with a dynamic disk space allocation technique, in accordance with one embodiment of the invention.

Referring to FIG. 2B, as segments are needed to store data, the next available segment descriptor, e.g., segment descriptor 32, is identified from the free segment list 50, the data is stored in the segment, and the segment descriptor 32 is assigned to a new table called a segment map 66. The segment map 66 maintains information representing how each segment defines the virtual storage device. More specifically, the segment map provides the logical sector to physical sector mapping of a virtual storage device. After the free segment descriptor 32 is moved or stored in the appropriate area of the segment map 66, which in this example is slot 2 (70), the descriptor is no longer a free segment but is now an allocated segment. A detailed description of this method for dynamically allocating disk space can be found in U.S. patent application Ser. No. 10/052,208, entitled "Dynamic Allocation of Computer Memory," filed Jan. 17, 2002, which is incorporated herein by reference in its entirety.

Backup storage system 140 may be implemented by any system capable of storing data generated for the purpose of backing up data stored on primary storage system 130. In the illustrative embodiment shown in FIG. 1, backup storage system 140 is implemented by a system similar to that of primary system 130. Accordingly, backup system 140 comprises backup manager 265, interface 260, memory 270, staging storage device 271, and storage devices 280-1 through 280-M, where M is an integer. However, in other embodiments, backup storage system 140 may be configured in a different manner than primary storage system 130.

In one embodiment, backup manager 265 of backup system 140 and storage manager 220 of primary system 130 both utilize the dynamic disk space allocation technique described above. Accordingly, when a respective block of data is stored on primary system 130, storage manager 220 of primary system 130 generates a segment descriptor containing an identifier for the data block. When a copy of the respective data block is transmitted to backup system 140 for purposes of backing up the data, backup manager 265 of backup system 140 separately generates a segment descriptor for the copied data block. In accordance with this embodiment, although the physical location of the respective data block on primary system 130 may be different from the physical location of the copied data block on backup system 140, primary system 130 and backup system 140 use the same segment identifier information for the two respective data blocks. In this way, primary system 130 and backup system 140 can identify and find a given block of data on primary system 130 and the corresponding data block stored on backup system 140.

In accordance with a first aspect of the invention, a data write command containing a data item is transmitted by host 110 to primary storage system 130, and in response, storage manager 220 causes the data item to be stored on storage devices 240. Storage manager 220 causes a backup copy of the data item to be stored on backup storage system 140 in accordance with a selected method for backing up data. In one embodiment, in a default mode of operation, a continuous replication method is utilized for backing up data. Continuous replication may be performed synchronously, or asynchronously.

Continuous Replication Method: Synchronous Form

In one embodiment, storage manager 220 may utilize a synchronous form of the continuous replication method for backing up data. Accordingly, storage manager 220 receives from client 110 a data write command containing a data item. The data write command may also contain associated metadata, including data identifying an assigned data block to which the data item is to be written. In response, storage manager 220 causes the data item to be written to an assigned location in primary system 130, and transmits the data item directly to backup system 140. Backup manager 265 of backup system 140 receives the data item, and causes the data item to be stored on storage devices 280.

After the data item has been successfully stored in primary system 130 and in backup system 140, storage manager 220 transmits a "write complete" acknowledgment message to client 110. Additional data processing requests from client 110 are processed only after the write complete message has been transmitted to client 110.

Continuous Replication Method: Asynchronous Form

Figure 3:
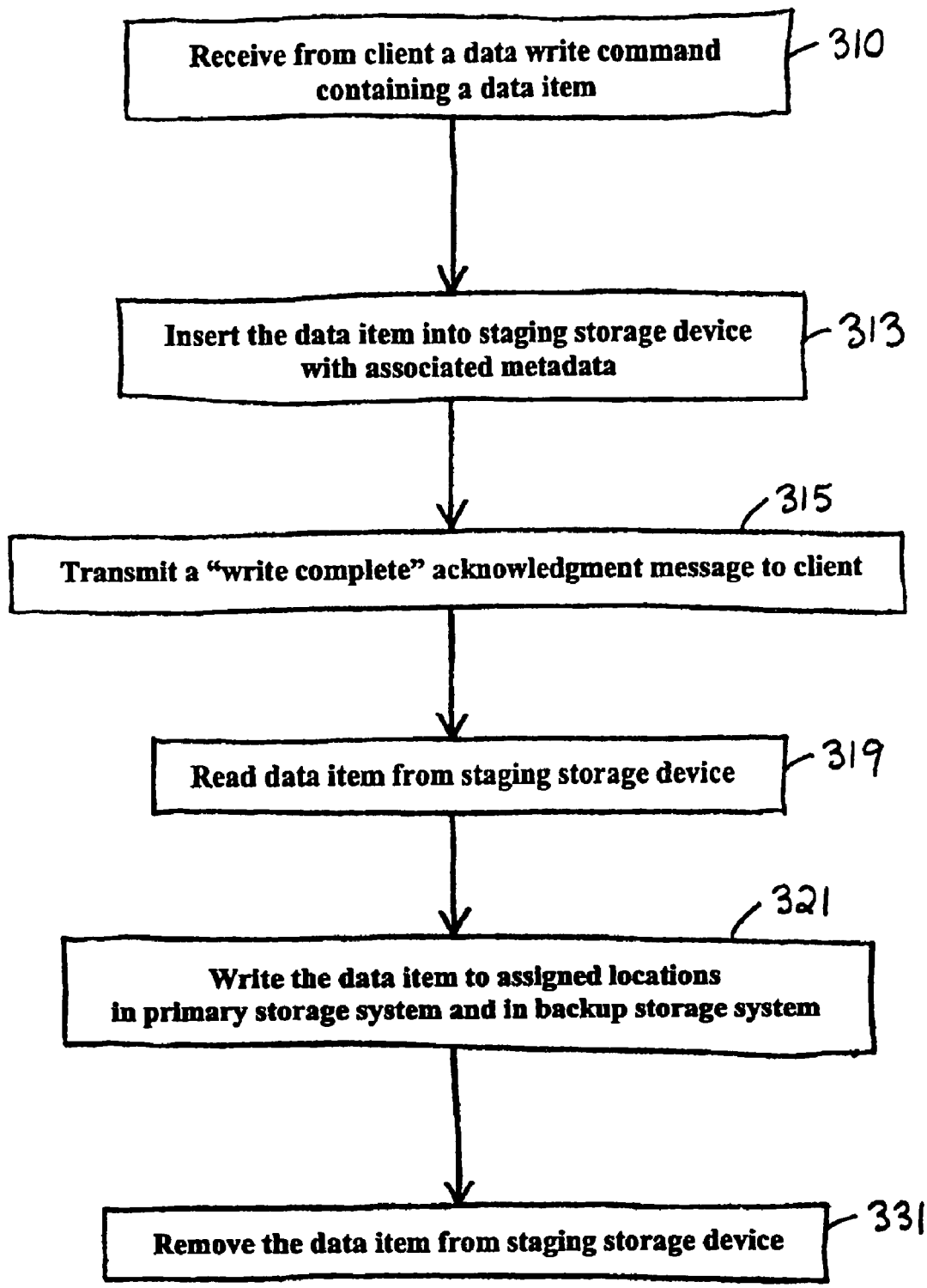
FIG. 3 is a flowchart depicting a routine for utilizing an asynchronous form of the continuous replication method to store data, in accordance with an embodiment of the invention.

In an alternative embodiment, storage manager 220 may utilize an asynchronous form of the continuous replication method for backing up data. FIG. 3 is a flowchart depicting a routine for utilizing an asynchronous form of the continuous replication method to store data, in accordance with this embodiment. At step 310, storage manager 220 receives from client 110 a data write command containing a data item. In this embodiment, the data write command may additionally contain metadata pertaining to the data item, including data identifying an assigned data block to which the data item is to be written. At step 313, storage manager 220 inserts the data item into staging storage device 213 along with the associated metadata. At step 315, storage manager 220 transmits a write complete acknowledgment message to client 110. After the write complete message is sent, storage manager 220 begins to process additional data processing requests received from client 110.

At step 319, storage manager 220 reads the data item and the associated metadata from staging storage device 213, and, at step 321, causes the data item to be written to assigned locations in primary system 130 and in backup system 140. In one embodiment in which backup manager 265 of backup system 140 and storage manager 220 of primary system 130 both utilize the dynamic disk allocation technique described above, the metadata associated with a data item may indicate a virtual address rather than a physical address for the data item. Accordingly, in this embodiment, storage manager 220 may perform step 321 by translating the virtual address to an assigned physical address on storage devices 240, and writing the data item to the assigned physical location. To write the data item to backup system 140, storage manager 220 may transmit the data item and its associated metadata to backup system 140. In this case, backup manager 265 may receive the data item, translate the virtual address to a physical address on storage devices 280, and write the data item to the assigned location.

After the data item has been successfully stored in primary system 130 and in backup system 140, storage manager 220 removes the data item from staging storage device 213 (step 331).

It should be noted that many variations of the methods outlined above are available for performing continuous replication, and the system of FIG. 1 is not limited to the two methods described above. For example, in one alternative embodiment, an asynchronous form of the continuous replication method may be utilized which proceeds as follows: storage manager 220 receives from client 110 a data write command containing a data item and associated metadata. In response, storage manager 220 causes the data item to be written directly to an assigned location on storage devices 240 in primary system 130, and transmits a write complete acknowledgment message to client 110. Additional data write commands from client 110 are processed after the acknowledgment message has been transmitted to client 110.

In accordance with this embodiment, storage manager 220 additionally inserts the data item into staging storage device 213. The data item remains temporarily in staging storage device 213. Subsequently, the data item is read from staging storage device 213, written to backup system 140, and removed from staging storage device 213.

In accordance with a second aspect of the invention, storage manager 220 monitors various activities of primary storage system 130, detects a predetermined condition or conditions, and in response, selects an alternative method for storing data. For example, in one embodiment, storage manager 220 switches to a delta replication method for storing data.

Interruption in Communication Link

In one embodiment, storage manager 220 monitors the status of the communication link between primary system 130 and backup system 140. As long as the communication link between primary system 130 to backup system 140 is functioning adequately (i.e., data transmitted from primary system 130 to backup system 140 is received by backup system 140 without an unacceptable delay), storage manager 220 continues to store data in accordance with a continuous replication technique. If communications between primary system 130 and backup system 140 are interrupted or experience an unacceptable delay, storage manager 220 switches to a delta replication method for storing data.

Figure 4:
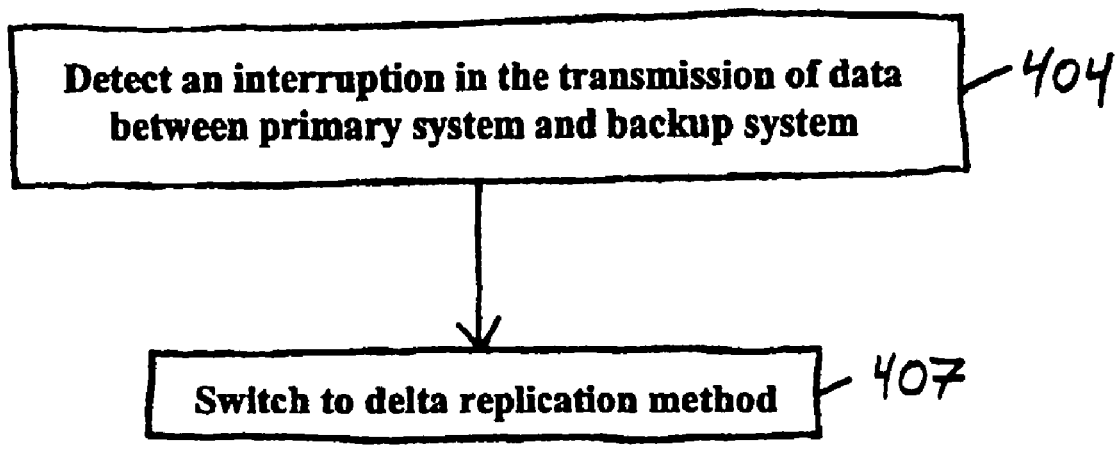
FIG. 4 is a flowchart depicting a routine for selecting an alternative method for storing data, in accordance with an embodiment of the invention.

FIG. 4 is a flowchart depicting a routine for selecting an alternative method for storing data, in accordance with this embodiment of the invention. In this embodiment, in default mode, storage manager 220 stores data in accordance with an asynchronous form of the continuous replication technique. In this embodiment, storage manager 220 may utilize, for example, the method outlined in FIG. 3. Accordingly, upon receipt from client 110 of a data write command containing a data item, storage manager 220 stores the data item and its associated metadata in staging storage device 213, and sends a write complete acknowledgment message to client 110. Storage manager 220 reads the data item from staging storage device 213 and writes the data item to assigned locations on primary system 130 and backup system 140. After the data item has been successfully stored in primary system 130 and in backup system 140, storage manager 220 removes the data item from staging storage device 213.

Referring to FIG. 4, at step 404, storage manager 220 detects a communication problem causing an interruption in the transmission of data between primary system 130 and backup system 140. By way of example, a power outage may cause network 120 to be temporarily unavailable. Accordingly, at step 407, storage manager 220 switches to a delta replication method for storing data.

Delta Replication Method

In one embodiment, upon switching to a delta replication method, storage manager 220 monitors the data blocks in primary system 130 that are changed, and from time to time copies the changed data blocks to backup system 140. In one embodiment, storage manager 220 may maintain a delta table, such as that shown in FIG. 5, which records data blocks on primary system 130 that have been changed. Delta table 750 comprises two columns, 754 and 756. Column 754 lists each data block present on primary system 130. Column 756 contains, for each respective data block, a flag indicating whether or not the data block has been overwritten. In one embodiment, the flag is a binary value: a zero in column 756 indicates that the corresponding data block has not been changed; a one in column 756 indicates that the data block has been overwritten. In this example, referring to rows 758 and 759, data block 1 has not been changed, while data block 2 has been overwritten.

Referring again to FIG. 4, upon detecting an interruption in the transmission of data between primary system 130 and backup system 140, storage manager 220 ceases any attempt to transmit data items to backup system 140. Storage manager 220 also ceases writing data items to staging storage device 213.

In this embodiment, when operating in the delta replication mode, storage manager 220 may receive a data item from client 110 and write the data item directly to an assigned data block on storage devices 240 in primary system 130. In addition, when a data item is written to a respective data block in primary system 130, storage manager 220 updates delta table 750 to record the change.

Figure 5:
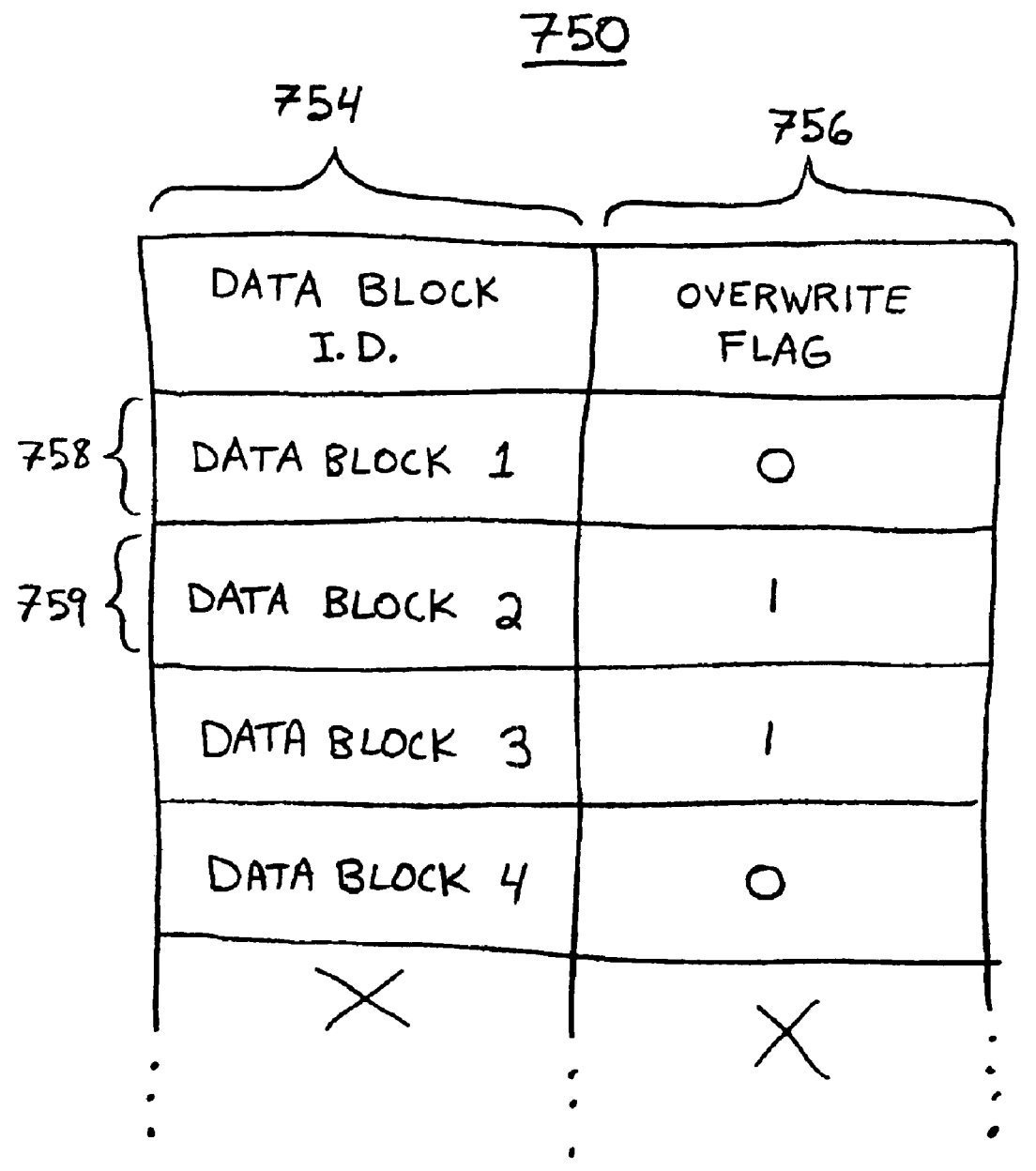
Figure 6:
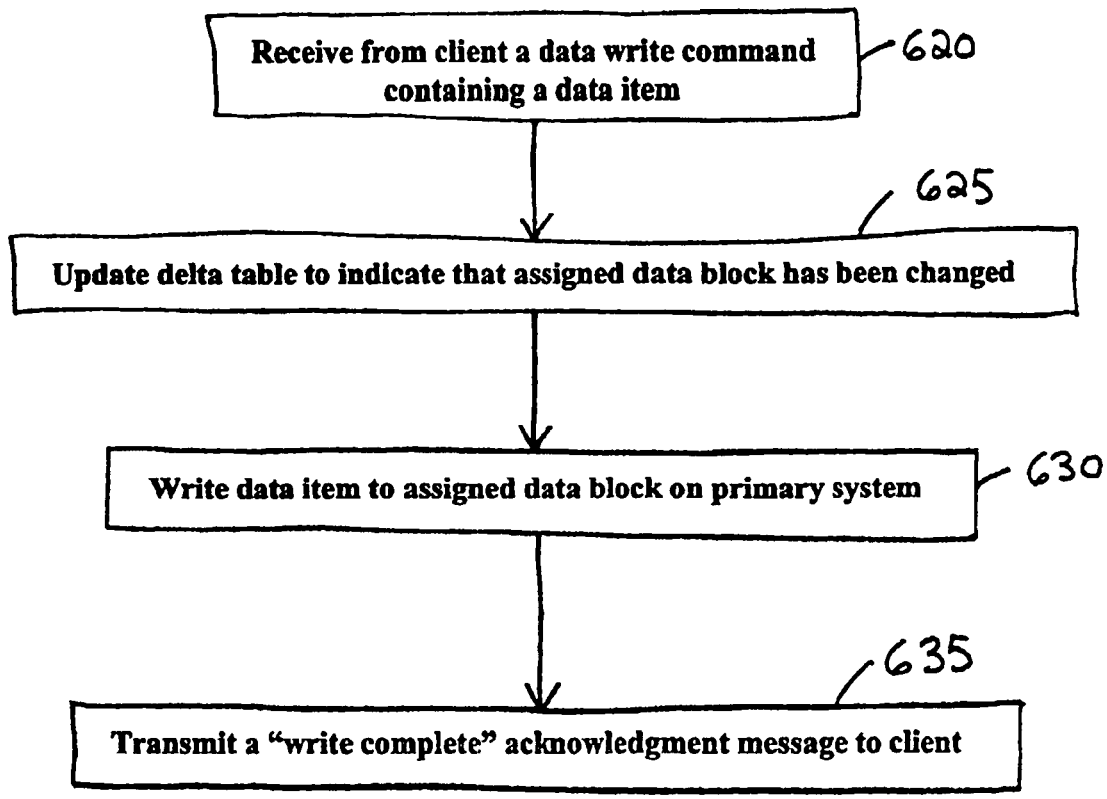
FIG. 6 is a flowchart depicting a routine for storing data, in accordance with an embodiment of the invention.

FIG. 6 is a flowchart depicting a routine for storing data using delta replication, in accordance with one embodiment. At step 620, storage manager 220 receives from client 100 a data write command containing a data item, and associated metadata identifying an assigned data block. At step 625, storage manager 220 updates delta table 750 to indicate that the assigned data block has been changed. Referring to FIG. 5, storage manager 220 may update delta table 750 by identifying the row corresponding to the assigned data block, and change the overwrite flag in column 756 from zero to one. If the value in column 756 that corresponds to the assigned data block is already equal to one, no updating is necessary. At step 630, storage manager 220 writes the data item to the assigned data block on storage devices 240 in primary system 130. At step 635, storage manager 220 transmits a write complete acknowledgment message to client 110.

It should be noted that, in some embodiments, at the moment storage manager 220 switches from the continuous replication mode to the delta replication mode, there may be one or more data items stored in staging storage device 213 that have been stored in primary system 130 but have not yet been stored in backup system 140. Accordingly, in this embodiment, storage manager 220 may, upon switching to the delta replication mode, examine the contents of staging storage device 213, and for each respective data item stored therein, update delta table 750 to indicate a change to the data item's destination data block.

In accordance with another aspect of the invention, storage manager 220, when operating in the delta replication mode, from time to time performs a delta replication. In one embodiment, storage manager 220 performs a delta replication by copying selected data blocks from primary system 130 to backup system 140.

The timing of the delta replications may vary according to technical constraints and the needs of users and/or system operators. For example, in one embodiment, storage manager 220 may perform delta replications periodically, e.g., once every thirty minutes. In another embodiment, storage manager 220 may perform delta replications only when prompted by the system operator. In yet another embodiment, storage manager 220 may perform delta replications at times when network traffic is low, when few data write commands are received from clients, etc.

Figure 7:
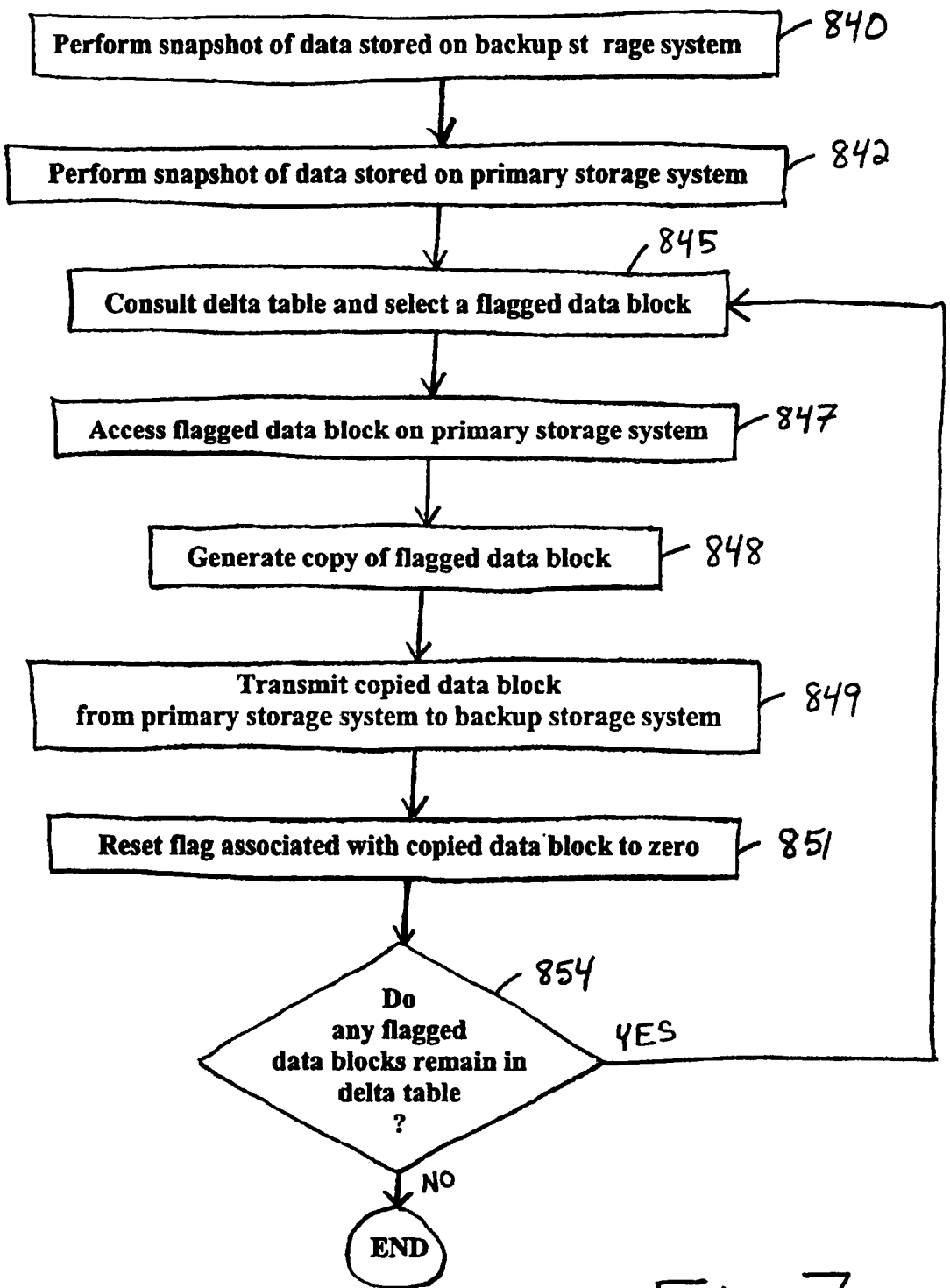
FIG. 7 is a flowchart depicting a routine for performing a delta replication, in accordance with an embodiment of the invention.

To perform a delta replication, storage manager 220 copies to backup system 140 those data blocks that have been changed since storage manager 220 switched to the delta replication mode, or since the previous delta replication. FIG. 7 is a flowchart depicting a routine for performing a delta replication, in accordance with one embodiment. This routine is also described with reference to delta table 750 of FIG. 5. At step 840, to reduce the risk that data stored on backup system 140 may become corrupted in the event a communication problem occurs during the delta replication, storage manager 220 performs a snapshot of the data stored on backup storage system 140. A snapshot is a record of data stored in a storage system at a selected moment in time. A snapshot may be used, for example, to recover an earlier version of the data in the event a current version becomes corrupted. Similarly, to mitigate the risk that the data on primary system 130 may become corrupted during the delta replication, at step 842, storage manager 220 performs a snapshot of data stored on primary storage system 130. From this point on, the delta replication is performed based on the snapshot of data in primary system 130. Because the snapshot of data in primary system 130 is used to perform the delta replication, storage manager 220 may at this point resume processing data processing requests received from client 110.

At step 845, storage manager 220 consults delta table 750 and selects a data block that has been changed. Referring to FIG. 5, storage manager 220 may select a data block that is flagged, e.g., data block 2. At step 847, storage manager 220 accesses the flagged data block on primary storage system 130. At step 848, storage manager 220 generates a copy of the flagged data block. At step 849, storage manager 220 transmits the copied data block from primary storage system 130 to backup storage system 140. Backup manager 265 of backup system 140 receives the copied data block and causes it to be stored on storage devices 280. At step 851, storage manager 220 resets, to zero, the value in column 756 of delta table 750 that is associated with the copied data block. Referring to block 854, if any flagged data blocks remain in delta table 750, the routine returns to step 845, and another data block is selected and copied. If no flagged data blocks remain in delta table 750, the routine comes to an end. When the delta replication is completed, storage manager 220 may resume storing data according to the delta replication method.

In one embodiment, while a delta replication is being performed, storage manager 220 may continue to receive and process data write commands from client 110; however, because delta table 750 is unavailable during this time, storage manager 220 may write data items to staging storage device 213 as they are received. In this embodiment, after the delta replication is completed, storage manager 220 may examine the contents of staging storage device 213, and for each respective data item stored therein, update delta table 750 to indicate a change to the data item's destination data block. In an alternative embodiment, a snapshot of delta table 750 is also generated when the snapshot of data in primary system 130 is created. In this embodiment, the delta replication is performed based on the snapshot of delta table 750 and the snapshot of data in primary system 130, allowing primary system 130 to continue operating as before.

Referring again to the embodiment illustrated in FIG. 4, while operating in delta replication mode, storage manager 220 continues to monitor the status of the communications link between primary system 130 and backup system 140. If storage manager 220 detects that the communications link is restored and begins again to function adequately, storage manager 220 may switch back to the continuous replication method. In this embodiment, because some data may have been stored in primary system 130 since the most recent delta replication, storage manager 220 may perform a final delta replication prior to switching again to the continuous replication mode.

Avoiding Data Overflow in Staging Storage Device

In accordance with a third aspect of the invention, storage manager 220 monitors the contents of staging storage device 213 and switches to a delta replication method for storing data if it detects a significant risk that staging storage device 213 may overflow and cause a loss of data. For example, storage manager 220 may monitor the flow of data into staging storage device 213, and the flow of data from staging storage device 213, and switch to a delta replication method if an imbalance is detected.

Figure 8:
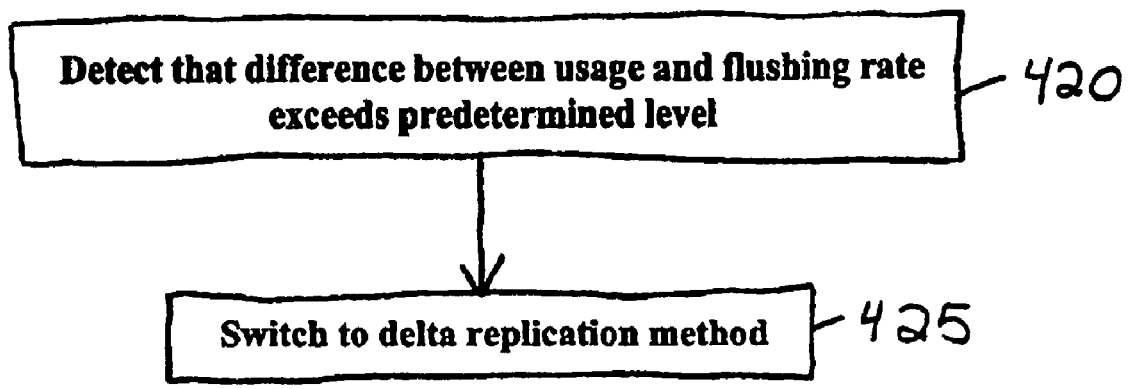
FIG. 8 is a flowchart depicting a routine for selecting an alternative method for storing data, in accordance with another embodiment of the invention.

FIG. 8 is a flowchart depicting a routine for selecting an alternative method for storing data, in accordance with one embodiment. In this embodiment, in default mode, storage manager 220 may store data in accordance with an asynchronous form of the continuous replication technique. In this embodiment, storage manager 220 may utilize, for example, the method outlined in FIG. 3. Accordingly, upon receipt from client 110 of a data write command containing a data item and its associated metadata, storage manager 220 stores the data item in staging storage device 213, and sends a write complete acknowledgment message to client 110. Storage manager 220 reads the data item from staging storage device 213 and writes the data item to assigned locations in primary system 130 and in backup system 140. After the data item has been successfully stored in primary system 130 and in backup system 140, storage manager 220 removes the data item from staging storage device 213.

In accordance with this embodiment, while operating in default mode, storage manager 220 monitors the rate of data transmitted to staging storage device 213 (referred to as the "usage") and the rate at which data items are read from staging storage device 213 and transmitted to backup system 140 (referred to as the "flushing rate"). If the difference between the usage and the flushing rate remains below a predetermined level, storage manager 220 continues to store data in accordance with the continuous replication method. If the difference between the usage and the flushing rate exceeds the predetermined level, storage manager 220 switches to a delta replication method for storing data. In one embodiment, the predetermined level may be defined as a level above which staging storage device 213 may overflow, causing data to be lost.

Thus, in the example illustrated in FIG. 8, at step 420, storage manager 220 detects that the difference between the usage and the flushing rate exceeds a predetermined level. Accordingly, at step 425, storage manager 220 switches to the delta replication method.

In this embodiment, upon determining that the difference between the usage and the flushing rate is excessive, storage manager 220 ceases transmitting data items from staging storage device 213 to backup system 140, and ceases inserting data items into staging storage device 213. Instead, storage manager 220 may begin to store data using the delta replication method described above with reference to FIG. 6.

It should be noted that, in some embodiments, at the moment storage manager 220 switches to the delta replication method, there may be one or more data items stored in staging storage device 213 that have been stored in primary system 130 but have not yet been transmitted to backup system 140. Accordingly, upon switching to the delta replication method, storage manager 220 may examine the contents of staging storage device 213, and for each data item stored therein, update delta table 750 to indicate a change to the data item's destination data block.

In yet another embodiment, storage manager 220 may determine that the risk of data overflow is excessive when the quantity of data stored in staging storage device 213 exceeds a predetermined limit. The limit may be set by the operator to reflect a level of risk that is deemed to be unacceptable. By way of example, the limit may be defined as 90% of the memory capacity of staging storage device 213. In this example, if it is detected that staging storage device 213 is more than 90% full, storage manager 220 may switch to a delta replication method for storing data.

Excessive Redundancy in Staging Storage Device

In accordance with a fourth aspect of the invention, storage manager 220 monitors the level of redundancy associated with the data items within staging storage device 213. The level of redundancy is determined by the manner in which data items are stored in primary system 130 and in backup system 140. For example, in one embodiment, writing a single data item to a specified data block requires rewriting the entire data block. Thus, in this embodiment, if storage manager 220 receives from client 110 a data write command to change a single byte in, say, data block 1, storage manager 220 must rewrite data block 1 in its entirety in primary system 130, and also transmit data block 1 in its entirety to backup system 140. Similarly, if staging storage device 213 contains two data items destined for data block 1 on backup system 140, storage manager 220 must transmit data block 1 twice, in its entirety, to backup system 140. It can thus be understood that if staging storage device 213 contains many data items destined for the same data block or data blocks in backup system 140, it may be necessary for storage manager 220 to transmit large quantities of repetitive information to backup system 140 (even though there may be no repetition among the data items themselves), and the level of redundancy may quickly become significant. If the level of redundancy becomes significant enough, at some point it may become desirable to stop reading data items from staging storage device 213 and transmitting the corresponding data blocks individually to backup system 140. Instead, at a certain point, it may be more effective to read out all of the data items present in staging storage device 213, store them in primary system 130, and then perform a single delta replication operation.

Thus, in accordance with yet another embodiment of the invention, storage manager 220 switches to a delta replication method for storing data when it determines that the level of redundancy within staging storage device 213 exceeds a predetermined limit.

In this embodiment, in default mode, storage manager 220 stores data in accordance with an asynchronous form of the continuous replication technique. In this embodiment, storage manager 220 may utilize, for example, the method outlined in FIG. 3. Accordingly, upon receipt from client 110 of a data write command containing a data item, storage manager 220 inserts the data item and its associated metadata into staging storage device 213, and sends a write complete acknowledgment message to client 110. Storage manager 220 reads the data item from staging storage device 213 and writes the data item to primary system 130 and to backup system 140. After the data item has been successfully stored in primary system 130 and in backup system 140, storage manager 220 removes the data item from staging storage device 213.

In this embodiment, while operating in default mode, storage manager 220 monitors the level of redundancy within staging storage device 213. To perform this task, storage manager 220 may maintain a data table such as that shown in FIG. 9. Data table 525 comprises three columns, 532, 533 and 534. Column 532 contains a list of each destination data block for which a data item is currently stored in staging storage device 213. For example, referring to table 525 of FIG. 9, staging storage device 213 currently holds data items destined for data block 2, data block 3 and data block 8. Column 533 contains information indicating the number of data items within staging storage device 213 that are destined for each respective data S block listed in column 532. Referring to row 537 of FIG. 9, for example, staging storage device 213 currently holds three data items destined for data block 2. Column 534 includes, for each listed data block, a count of the total number of bytes of data that must be transmitted to backup system 140 if the respective data items are stored in accordance with a continuous replication method. In this example, it is supposed that a single data block has a size of 1000 bytes. Thus, referring again to row 537, if the continuous replication method is used to store the three data items destined for data block 2 on backup system 140, 3000 bytes of data must be transmitted to backup system 140. Referring to row 538, a single data block destined for data block 3 is currently stored in staging storage device 213, requiring a transfer of 1000 bytes to backup system 140. Referring now to row 539, five data items destined for data block 8 are currently stored in staging storage device 213, requiring a transfer of 5000 bytes to backup system 140.

In this embodiment, data table 525 also includes fields 541, which contains a count of the data blocks that are listed in column 532. In this example, field 541 contains the value 3, indicating that three data blocks are listed in column 532. Similarly, field 542 contains the sum of the values stored in column 534. In this example, field 542 contains the value 9000, equal to the sum of 3000, 1000, and 5000. In other words, if the continuous replication method is used to store all of the data items currently stored in staging storage device 213, 9000 bytes must be transferred to backup system 140. It should be noted that data table 525 shown in FIG. 9 is for illustrative purposes. In alternative embodiments, storage manager 220 may utilize a data table having a different data structure. For example, in one alternative embodiment, a data table may be utilized that does not include fields 541 and 542. In still other embodiments, storage manager 220 may not use a data table.

In this embodiment, when a data item destined for a respective data block is inserted into staging storage device 213, storage manager 220 updates data table 525 by adding a new row for the data block, if necessary. Otherwise, storage manager 220 increases by one the value in column 533 that corresponds to the respective data block. Storage manager 220 additionally adjusts the associated value in column 534 by an appropriate amount. Conversely, when a data item is removed from staging storage device 213, storage manager 220 reduces by one the corresponding entry in column 533 (and eliminates the row, if appropriate), and reduces the corresponding entry in column 534 by an appropriate amount.

Figure 10:
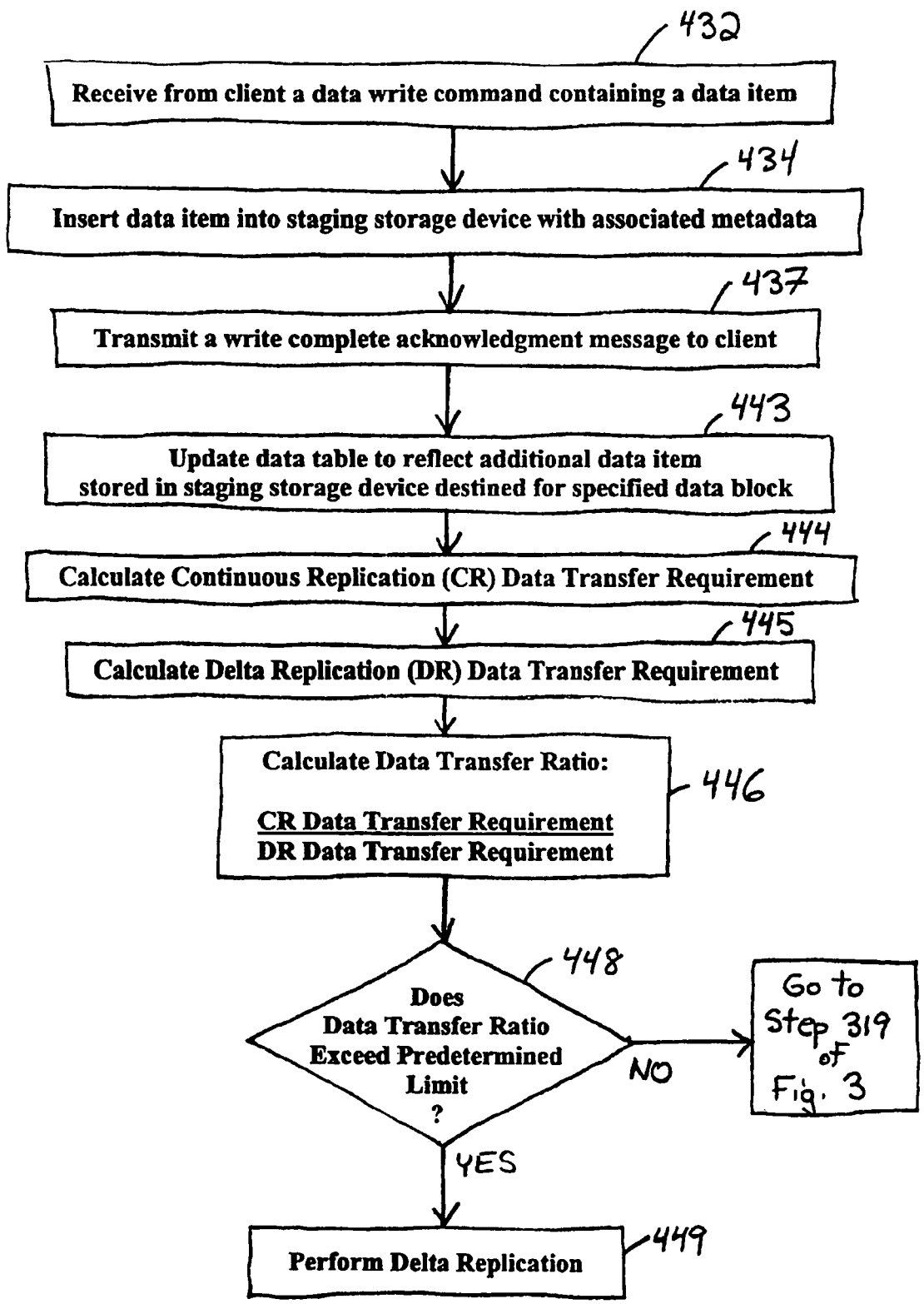
FIG. 10 is a flowchart depicting a routine for storing data, in accordance with yet another embodiment of the invention.

In this embodiment, storage manager 220 utilizes data table 525 to monitor the level of redundancy within staging storage device 213. If the level of redundancy exceeds a predetermined limit, storage manager 220 switches to a delta replication method for storing data. FIG. 10 is a flowchart depicting a routine for storing data in accordance with this embodiment. In this example, as indicated by steps 432-437, storage manager 220 may store data in accordance with a continuous replication method similar to that outlined in FIG. 3. Accordingly, at step 432, storage manager 220 may receive a data write command containing a data item. By way of example, storage manager 220 may receive a data write command containing a data item destined for, say, data block 2. At step 434, storage manager 220 inserts the data item and its associated metadata into staging storage device 213, and at step 437 transmits a write complete acknowledgment message to client 110.

At step 443, storage manager 220 updates data table 525 to reflect the data item stored in staging storage device 213. In this example, storage manager 220 may adjust the values in row 537 (which is associated with data block 2) to reflect the insertion into staging storage device 213 of an additional data item destined for data block 2 on backup system 140. Storage manager 220 also updates the value in column 534 indicating the total number of bytes of data that must be transmitted and written to backup system 140 in order to store all the data items destined for data block 2.

At step 444, storage manager 220 ascertains a value referred to as the "continuous replication data transfer requirement," or "CR data transfer requirement." The CR data transfer requirement represents the quantity of data that must be transferred to backup system 140 if a continuous replication method is utilized to back up all of the data items currently present in staging storage device 213. Referring to data table 525, the CR data transfer requirement may be obtained from field 542. In this example, then, the CR data transfer requirement equals 9000 bytes.

At step 445, storage manager 220 ascertains a value referred to as the "delta replication data transfer requirement," or "DR data transfer requirement." The DR data transfer requirement represents the quantity of data that must be transferred to backup system 140 if a single delta replication is utilized to back up all of the data items currently present in staging storage device 213. Referring to data table 525, the DR data transfer requirement may be calculated by multiplying the value stored in field 541 by the size, in bytes, of a single data block. In this example, the DR data transfer requirement equals 3 times 1000 bytes=3000 bytes.

At step 446, storage manager 220 calculates a ratio referred to as the "data transfer ratio." The data transfer ratio measures the redundancy within staging storage device 213 by comparing the CR data transfer requirement to the DR data transfer requirement. Specifically, the data transfer ratio equals the CR data transfer requirement divided by the DR data transfer requirement; in this example the data transfer ratio equals 9000/3000=3. This value indicates that three times more data must be transmitted to backup system 140 if a continuous replication method is used than if the delta replication method is used.

Referring to block 448, if the data transfer ratio exceeds a predetermined limit, storage manager 220 switches to a delta replication method (step 449). Otherwise, the routine resumes storing data by the continuous replication method; in this embodiment, the routine continues at step 319 of FIG. 3. In this embodiment, the predetermined limit may be established by the system operator.

It should be noted that the method described herein for measuring redundancy within staging storage device 213 by computing the data transfer ratio should not be construed as limiting the scope of the present invention. In alternative embodiments, redundancy within staging storage device 213 may be measured by other methods.

Figure 11:
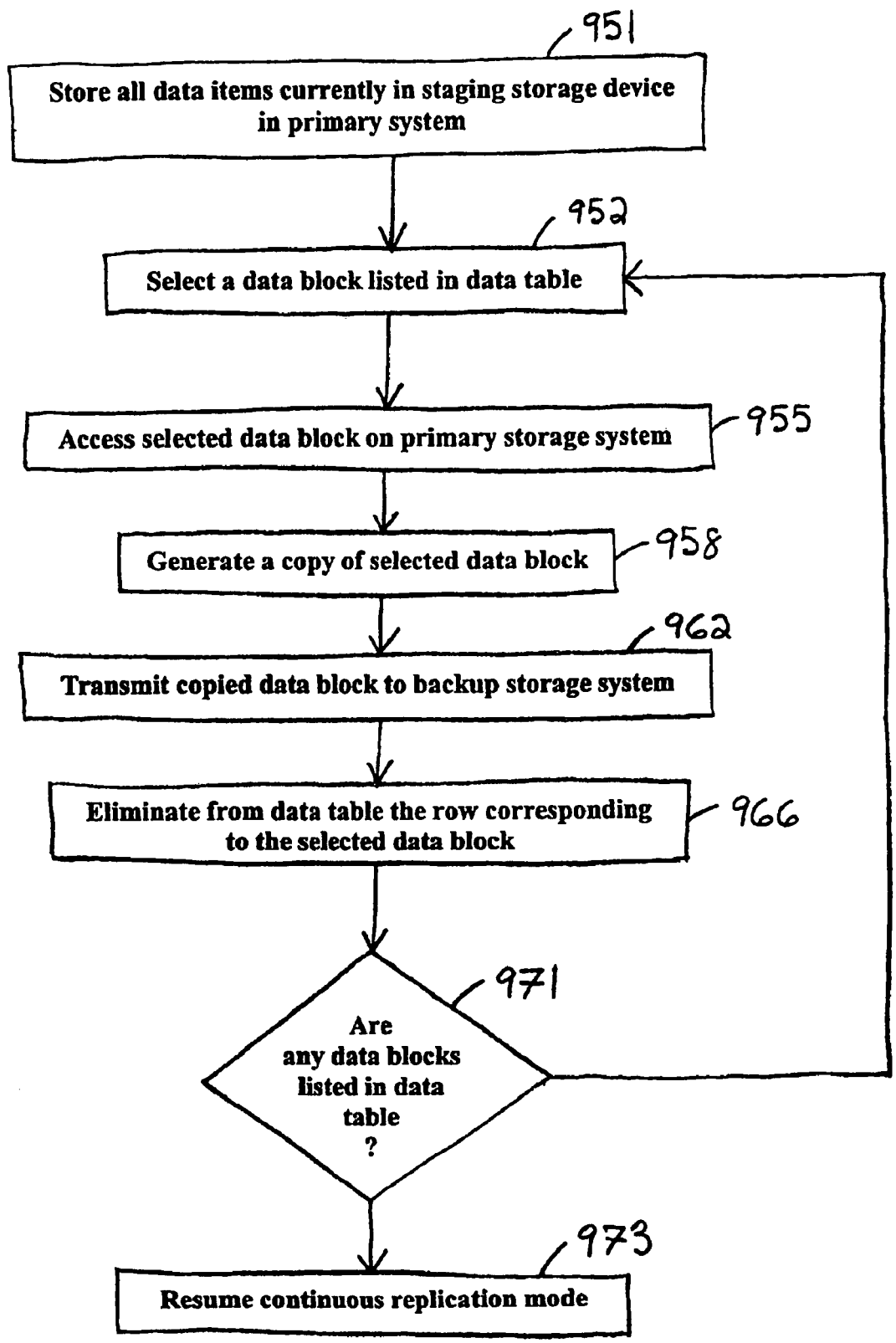
FIG. 11 is a flowchart depicting a routine for performing a delta replication, in accordance with another embodiment of the invention.

Upon switching to the delta replication method, storage manager 220 ceases transmitting data items from staging storage device 213 to backup system 140, and ceases inserting data items into staging storage device 213. In this embodiment, storage manager 220 performs a delta replication based on the data items that are currently stored in staging storage device 213. FIG. 11 is a flowchart depicting a routine for performing a delta replication, in accordance with this embodiment. At step 951, storage manager 220 stores all of the data items currently in staging storage device 213 in primary system 130. At this point, in one embodiment, storage manager 220 may cause a first snapshot of data on primary system 130, and a second snapshot of data on backup system 140, to be generated.

At step 952, storage manager 220 selects from data table 525 a data block listed in column 532. Referring to FIG. 9, storage manager 220 may select, e.g., data block 2. At step 955, storage manager 220 accesses the selected data block on primary storage system 130. At step 958, storage manager 220 generates a copy of the selected data block. At step 962, storage manager 220 transmits the copied data block to backup storage system 140. Backup manager 265 receives the copied data block and causes it to be stored on storage devices 280. At step 966, storage manager 220 eliminates the row corresponding to the respective data block from data table 525. Referring to block 971, if at this point any data blocks are still listed in column 532 of data table 525, the routine returns to step 952, and another data block is selected and copied. If column 532 is empty, indicating that all data blocks have been copied, at step 973 storage manager 220 resumes storing data in accordance with the continuous replication method originally employed.

The foregoing merely illustrates the principles of the invention. It will thus be appreciated that those skilled in the art will be able to devise numerous other arrangements which embody the principles of the invention and are thus within its spirit and scope.

For example, the system of FIG. 1 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. An apparatus for storing data in one or more data storage systems by selecting from among at least a first operating mode and a delta replication operating mode, comprising:
   means for storing data pursuant to the first operating mode;
   means for ascertaining a first status of a criterion pertaining to an activity performed by the one or more data storage systems while operating in the first operating mode;
   means for detecting a change in the criterion to a second status; and
   means for storing data pursuant to the delta replication operating mode in response to the change.

2. The apparatus of claim 1, wherein the first operating mode includes continuous replication.

3. The apparatus of claim 2, wherein the continuous replication is performed synchronously.

4. The apparatus of claim 2, wherein the continuous replication is performed asynchronously.

5. The apparatus of claim 1, wherein the one or more data storage systems include a primary storage system and a backup storage system.

6. The apparatus of claim 1, wherein the criterion includes an indicator of a performance of a communication link between a primary storage system and a backup storage system.

7. The apparatus of claim 1, wherein the second status includes an indication of an interruption in a transmission of data via the communication link.

8. The apparatus of claim 1, wherein the criterion includes a comparison of a first rate of data flowing into a memory in a data storage system, and a second rate of data flowing from the memory.

9. The apparatus of claim 8, wherein the second status includes an indication that the second rate exceeds the first rate.

10. The apparatus of claim 1, wherein the criterion includes a measure of a quantity of data stored in a memory in the data storage system.

11. The apparatus of claim 1, wherein the criterion includes a measure of a redundancy within a memory in the data storage system.

12. The apparatus of claim 11, further comprising:
    means for identifying a first quantity of data required to be transmitted from the data storage system to a backup storage system in order to store a specified set of data items by the first operating mode; and
    means for identifying a second quantity of data required to be transmitted from the data storage system to the backup storage system in order to store the set of data items by the delta replication operating mode, wherein the measure is a comparison of the first quantity and the second quantity.

13. An apparatus for storing data in one or more data storage systems by selecting from among at least a delta replication operating mode and an alternative operating mode, comprising:
    means for storing data pursuant to the delta replication operating mode;
    means for ascertaining a first status of a criterion pertaining to an activity performed by the one or more data storage systems while operating in the delta replication operating mode;
    means for detecting a change in the criterion to a second status; and
    means for storing data pursuant to the alternative operating mode, in response to the change.

14. The apparatus of claim 13, wherein the alternative operating mode includes continuous replication.

15. The apparatus of claim 14, wherein the continuous replication is performed synchronously.

16. The apparatus of claim 14, wherein the continuous replication is performed asynchronously.

17. The apparatus of claim 13, wherein the one or more data storage systems include a primary storage system and a backup storage system.

18. The apparatus of claim 13, wherein the criterion includes an indicator of a performance of a communication link between a primary storage system and a backup storage system.

19. The apparatus of claim 13, wherein the first status includes an indication of an interruption in a transmission of data via the communication link.

20. The apparatus of claim 13, wherein the criterion includes a comparison of a first rate of data flowing into a memory in a data storage system, and a second rate of data flowing from the memory.

21. The apparatus of claim 20, wherein the first status includes an indication that the second rate exceeds the first rate.

22. The apparatus of claim 13, wherein the criterion includes a measure of a quantity of data stored in a memory in the data storage system.

23. The apparatus of claim 13, wherein the criterion includes a measure of a redundancy within a memory in the data storage system.

24. The apparatus of claim 23, further comprising:
means for identifying a first quantity of data required to be transmitted from the data storage system to a backup storage system in order to store a specified set of data items by the delta replication operating mode; and
means for identifying a second quantity of data required to be transmitted from the data storage system to the backup storage system in order to store the set of data items by the alternative operating mode, wherein the measure is a comparison of the first quantity and the second quantity.

25. An apparatus for storing data in a storage system comprising at least one first storage device and at least one second storage device, the apparatus comprising:
means for storing first data in at least one first storage device;
means for storing the first data stored in the at least one first storage device in at least one second storage device;
means for determining a condition;
means for storing second data in the at least one first storage device, in response to the condition; and
means for recording one or more memory locations associated with the storing of the second data in the at least one first storage device.

26. The apparatus of claim 25, further comprising:
means for determining a second condition; and
means for copying the second data from the at least one first storage device to the at least one second storage device, based at least in part on the one or more recorded memory locations, in response to the second condition.

27. The apparatus of claim 26, further comprising:
means for detecting a change of the condition to the second condition.

28. The apparatus of claim 27, comprising:
means for storing the first data in the at least one first storage device and in the at least one second storage device by continuous replication.

29. The apparatus of claim 27, comprising:
means for receiving a request to store specified data from a computer;
means for inserting the specified data in a memory;
means for transmitting an acknowledgment message to the computer;
means for transmitting the specified data to the at least one first storage device and to the at least one second storage device; and
means for removing the data item from the memory.

30. The apparatus of claim 27, wherein the condition comprises a status of a communication connection between the at least one first storage device and the at least one second storage device.

31. The apparatus of claim 30, wherein the condition occurs when the communication connection is interrupted.

32. The apparatus of claim 31, wherein the second condition occurs when the communication connection is in a functioning condition.

33. The apparatus of claim 27, wherein the condition is determined by determining a difference between a rate at which data are transmitted to the at least one first storage device and a rate at which data are read from the at least one first storage device and transmitted to the at least one second storage device.

34. The apparatus of claim 27, wherein the condition is determined by determining a quantity of data currently stored in a selected storage device.

35. The apparatus of claim 27, wherein the condition is determined by determining a level of redundancy within data currently stored in a selected storage device.

36. The apparatus of claim 35, comprising:
means for determining the level of redundancy within data currently stored in the selected storage device by computing a ratio of (1) a first quantity of data that must be transferred from the at least one first storage device to the at least one second storage device if a first method is used to back up data currently stored in the at least one first storage device, to (2) a second quantity of data that must be transferred from the at least one first storage device to the at least one second storage device if a second method is used to back up data currently stored in the at least one first storage device.

37. The apparatus of claim 27, comprising:
means for recording one or more data blocks in which second data is stored in the at least one first storage device.

38. An apparatus to store data in one or more data storage systems, comprising:
means for storing data pursuant to a selected storage mode comprising storing the data in at least one first storage device and in at least one second storage device;
means for detecting a first condition pertaining to an activity associated with the storing of the data;
means for storing data in the at least one first storage device, in response to the detected first condition;
means for recording in a database information identifying one or more data blocks in the at least one first storage device that are changed;
means for detecting a second condition pertaining to the activity; and
means for copying the one or more data blocks from the at least one first storage device to the at least one second storage device, based on the information, in response to the detected second condition.

39. The apparatus of claim 38, further comprising:
means for detecting a change of the first condition to the second condition.

40. The apparatus of claim 38, wherein the selected storage mode comprises continuous replication.

41. The apparatus of claim 40, wherein the continuous replication is performed synchronously.

42. The apparatus of claim 40, wherein the continuous replication is performed asynchronously.

43. The apparatus of claim 38, wherein the first condition comprises a condition of a communication connection between the at least one first storage device and the at least one second storage device.

44. An apparatus for storing data in a storage system comprising at least one first storage device and at least one second storage device and being capable of having at least a first status of a condition and a second status of the condition, the apparatus comprising:

means for receiving a request to store data;
means for checking a status of a condition of the storage system;
means for causing the data to be stored in the at least one first storage device and in the at least one second storage device, if the first status is detected;
means for storing the data in the at least one first storage device, if the second status is detected; and
means for recording one or more storage locations of the stored data in the at least one first storage device.

45. The apparatus of claim 44, further comprising:
means for checking the status of the condition; and
means for copying data from the at least one first storage device to the at least one second storage device, based at least in part on the one or more recorded storage locations, if it is determined that the second status has changed to a third status.

46. The apparatus of claim 1, further comprising:
means for monitoring for a change in the criterion to a second status.

47. The apparatus of claim 13, further comprising:
means for monitoring for a change in the criterion to a second status.

48. A method to store data, comprising:
receiving at least one first write command comprising first data;
storing the first data in a first storage device;
copying the first data from the first storage device to a second storage device and to a third storage device;
removing the first data from the first storage device;
detecting a first condition;
receiving at least one second write command comprising second data, after detection of the first condition;
storing the second data in the first storage device;
copying the second data from the first storage device to one or more locations in the second storage device;
generating a record of the one or more locations;
removing the second data from the first storage device;
detecting a second condition; and
copying the second data from the second storage device to the third storage device based at least in part on the record, after detection of the second condition.

49. The method of claim 48, wherein the first storage device comprises a staging storage device.

50. A method to back up data, comprising:
storing first data in a first storage system and in a second storage system in accordance with a first operating mode comprising:
storing the first data in one or more locations in the first storage system;
generating a record of the one or more locations;
detecting a condition; and
in response to the condition:
copying selected data from the first storage system to the second storage system based on the record; and
storing second data in the first storage system and in the second storage system in accordance with a second operating mode different from the first operating mode, after copying the selected data from the first storage system to the second storage system based on the record.

51. The method of claim 50, further comprising:
storing third data in accordance with the second operating mode prior to storing the first data in accordance with the first operating mode;
detecting a second condition after storing the second data; and
in response to the second condition:
storing the first data in the first storage system and in the second storage system in accordance with the first operating mode.

52. The method of claim 50, wherein the second operating mode comprises an operating mode chosen from the group consisting of: continuous replication performed synchronously and continuous replication performed asynchronously.

* * * * *